United States Patent
Bohman

[11] 3,877,596
[45] Apr. 15, 1975

[54] GOODS VEHICLE HAVING AT ITS REAR A VERTICALLY MOVABLE-DECK

[75] Inventor: Gote Hubert Bohman, Hudiksvall, Sweden

[73] Assignee: B.V. Foco Nederland, Bedum, Netherlands

[22] Filed: Aug. 14, 1973

[21] Appl. No.: 388,258

[30] Foreign Application Priority Data
Aug. 18, 1972  Sweden.......................... 10758/72

[52] U.S. Cl............................... 214/518; 214/75 T
[51] Int. Cl............................................. B60p 1/44
[58] Field of Search.......... 104/189, 190, 49, 172 B; 214/518, 75 R, 75 T

[56] References Cited
UNITED STATES PATENTS
3,204,797  9/1965  Chandler............................ 214/518
3,559,831  2/1971  Weston............................... 214/518

Primary Examiner—Albert J. Makay
Assistant Examiner—Lawrence J. Oresky
Attorney, Agent, or Firm—Newton, Hopkins & Ormsby

[57] ABSTRACT

An improved goods vehicle of the kind having a loading platform including an endless conveyor means arranged for movement in the longitudinal direction of the loading platform and including driving carriages to engage load-carrying means, generally in the form of transport containers. The vehicle has a vertically movable deck, e.g. consisting of one of the flaps closing the rear opening of the vehicle and arranged to support the load-carriers during engagement and disengagement of the containers relative to the driving carriages. Said deck includes a slanting surface as well as an area positioned at a lower level with respect thereto such that a first pair of container runner wheels which area mounted on a fixed support shaft may move over this area without contacting it whereas a second pair of container runner wheels having a pivotally mounted support shaft travel over a semi-circular track formed on said deck, this arrangement enhancing the movability of the containers while at the same time facilitating their engagement to and disengagement from the respective one of the driving carriages during loading and unloading.

5 Claims, 6 Drawing Figures

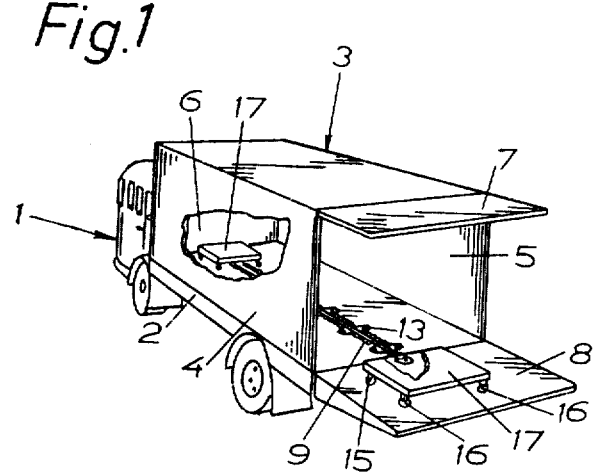
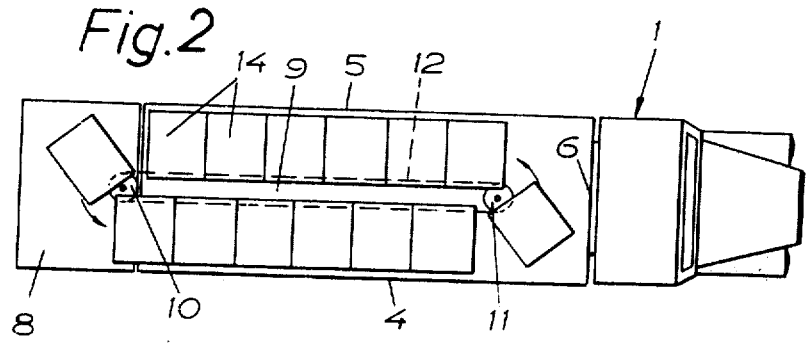

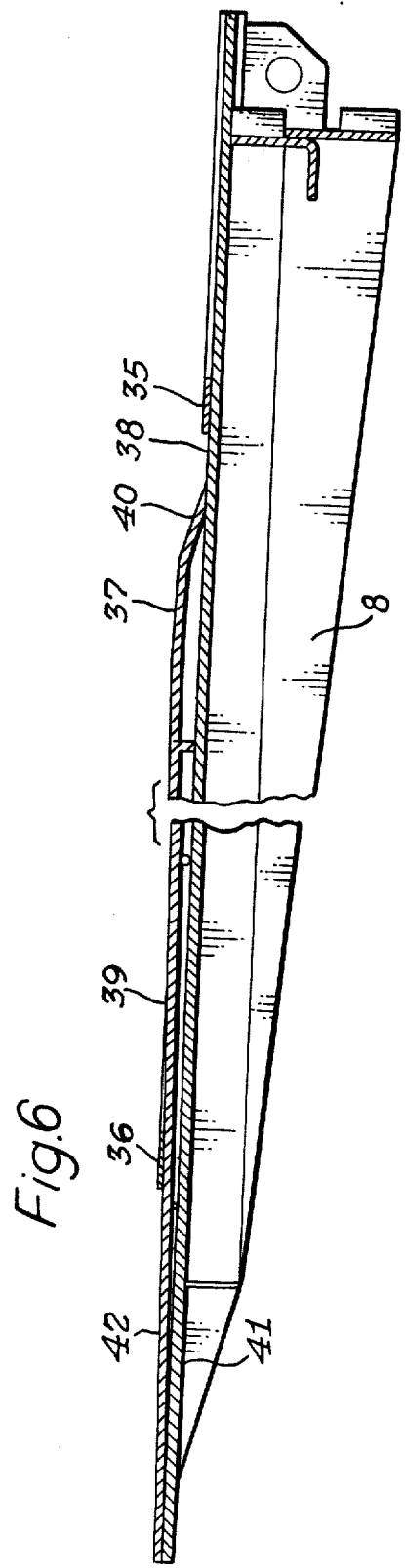

3,877,596

GOODS VEHICLE HAVING AT ITS REAR A VERTICALLY MOVABLE-DECK

BACKGROUND OF THE INVENTION

The present invention concerns a goods vehicle having a superstructure supported on a loading platform of the kind provided with a continuous conveyor means running over two pulleys at the ends of a support beam which is movable in the longitudinal direction of the loading platform. The conveyor means is provided with equidistantly spaced driving carriages to each one of which is connectable a load-carrier, usually in the form of a transport container, having one pair of runner wheels arranged on a fixed support shaft and one pair of runner wheels arranged on a pivotally mounted shaft. At its rear portion the goods vehicle is provided with a vertically movable support deck which advantageously may serve as a flap to close the rear opening of the vehicle superstructure and which may be moved to a position essentially flush with the loading platform.

SUMMARY OF THE INVENTION

The purpose of the invention is to arrange the flap deck in a manner to facilitate connection and disconnection of the load carriers to the driving carriages. The invention is characterised in that the flap deck is provided with a surface which extends slightly obliquely upwards and forwards towards a plateau, said plateau delimiting an area situated at a lower level within which area the loading container runner wheels having the fixed mounting shaft may be moved without coming into contact with the area. This ensures also that upon displacement of the load-carrier, when in connected state, from the flap deck to the intended place on the loading platform, the runner wheels having the fixed mounting shaft do not trail on the loading platform. Instead the load-carrier will be supported at this end by the support wheels provided on its associated driving carriage.

BRIEF DESCRIPTION OF THE DRAWINGS

Further characteristics of the invention will become apparent upon reading of the following detailed description with reference to the accompanying drawings wherein:

FIG. 1 is a perspective view illustrating obliquely from behind a goods vehicle provided with a conveyor mechanism intended for load-carriers and including a flap deck in accordance with the invention.

FIG. 2 is a plan view of the vehicle with the vehicle cover having been removed.

FIG. 6 is a vertical section through the flap deck along line VI—VI of FIG. 5.

DETAILED DESCRIPTION OF A PREFERRED EMBODIMENT

Figure 3:
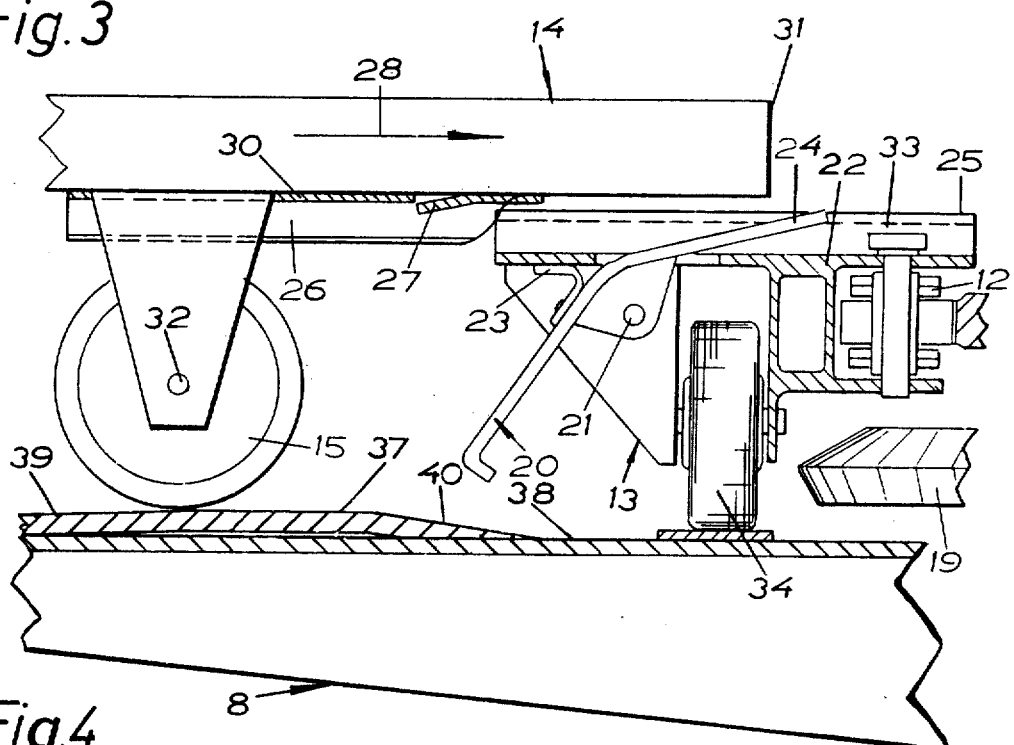
FIG. 3 illustrates on an enlarged scale a vertical longitudinal section through the rear portion of the conveyor mechanism and the front portion of one of the load-carriers prior to the connection thereof to one of the driving carriages.

FIG. 1 illustrates a goods vehicle 1 having a loading platform 2 which is provided with a superstructure 3 comprising two side walls 4, 5, a front wall 6, and two flaps 7, 8, of which flap 8 in addition to being foldable may also be lowered and raised. A support beam 9 is mounted for movement in the longitudinal direction of the loading platform 2, the ends of said beam supporting rotatably mounted chain wheels 10, 11 over which runs an endless conveyor chain 12. The latter is provided with equidistantly spaced carriages 13 adapted to drive load-carriers 14. FIG. 1 shows only the load-carrier bottom 17 supported by two pairs of wheels 15 and 16.

Figure 4:
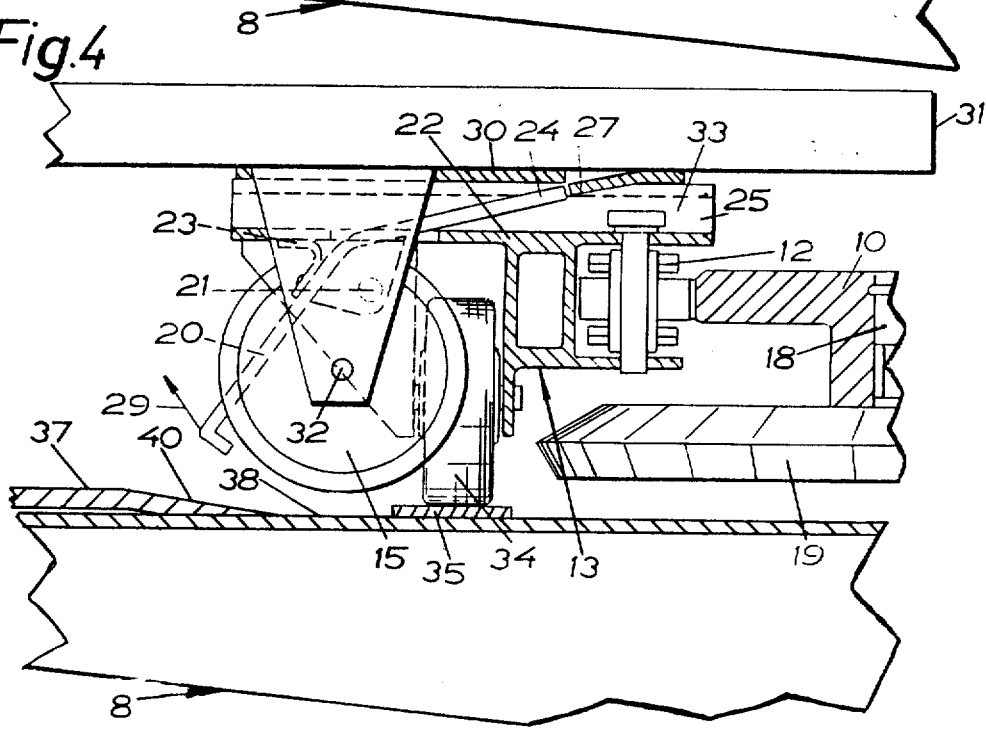
FIG. 4 is a similar sectional view but after such connection of the load-carrier.
Figure 5:
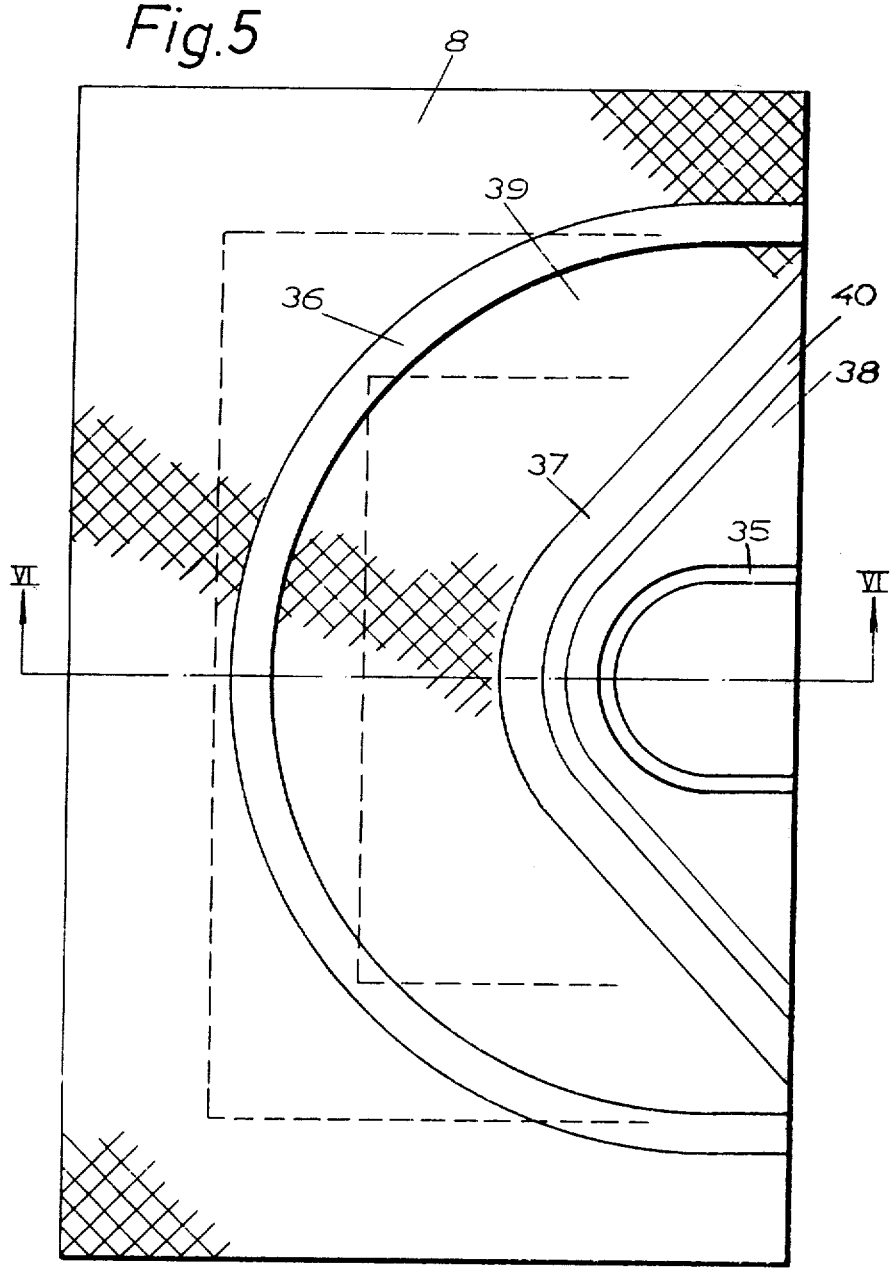
FIG. 5 is a plan view of the flap deck.

As illustrated in FIG. 4, the support beam is provided at its rear end with a vertical shaft 18 about which is rotatably mounted one, 10, of the chain wheels. To the chain wheel 10 is connected a conical cog wheel 19 with which cooperates a conical gear driven by a (not illustrated) hydraulic motor. The entire support beam 9 together with its chain wheels 10, 11 and the drive mechanism as well as the chain 12 running over the chain wheels and the driving carriages 13 may be displaced in the longitudinal direction of the loading platform 2 from a rear position (FIGS. 1 and 2) in which the rear end of the beam 9 projects outwards over the flap 8, to a forward position in which the entire conveyor mechanism is positioned wholly within the superstructure 3.

Each driving carriage 13 is provided with a two-arm lever 20 which serves as a blocking means and is pivotally mounted about a horizontal bolt 21 arranged on the frame 22 of its respective driving carriage. The lever 20 may be swung by a spring means 23 counterclockwise as seen in FIGS. 3 and 4, one, 24, of its arms then engaging obliquely upwards in a guide means 25 on the carriage 13. The load-carrier bottom 17 is provided at its lower portion with guide rails 26 fitting the guide 25, and with a blocking shoulder 27 behind which the free arm 24 snaps in a blocking manner upon displacement of the load-carrier 14 in the direction illustrated by arrow 28 in FIG. 3 onto the carriage 13. Release of the load-carrier 14 is effected by turning the lever 20 in the direction indicated by arrow 29 in FIG. 4, this operation being effected by means of an electrically, hydraulically or manually operated power means (not shown).

The guide rails 26 are formed by downwardly bent portions of a bottom sheet metal section 30, the rails thus formed diverging in the direction towards that end 31 of the load-carrier 14 at which are positioned the runner wheels 15 mounted in the fixed bearings 32. The side edges 33 of the guide means 25 diverge in the same direction as do guide rails 26 and at the same angle as the latter and they are so arranged that in position of connection the guide rails 26 engage with said guide edges 33. As appears clearly from FIGS. 3 and 4 the blocking shoulder 27 is formed by a tongue portion which is bent downwardly and rearwardly from the bottom sheet metal section 30.

The support wheels 34 of the driving carriages 13 run on a semi-circular rail 35 (or raised section) on the flap 8 which serves as a load-receiving deck on which the load-carriers may be supported during the connection and disconnection operations. The flap 8 is also provided with a semi-circular running track 36 for the pivotally mounted runner wheels 16 of the load-carriers 14. The flap 8 extends obliquely from the running track 36, inclining slightly upwards towards a plateau 37. Between the latter and the running track 35 for the support wheels 34 on the driving carriages 13 the flap 8 presents an area 38 positioned at a lower level.

When the load-carrier 14 is to be connected to one of the driving carriages 13 (see FIG. 3) the load-carrier is moved in the direction of arrow 28, the wheels 15 then rolling up the slightly upwardly inclining surface 39 of the flap deck 8. When the runner wheels 15 of the load-carrier 14 reach the plateau 37 the guide rails 26 are level with or preferably at a slightly (e.g. 3 to 4 millimeters) higher level than the guide edges 33. At the end of the displacement forwards of the load-carrier 14 its bottom metal section 30 slides in the guide 25 while at the same time the runner wheels 15 will float freely in the air above the flap deck 38 which is positioned at a lower level. The displacement of the load-carrier 14 continues until the free end of the arm 24 snaps up behind the blocking shoulder 27 (FIG. 4), thus effecting connection between the carriage and the load-carrier. When the transport chain 12 is moved over the chain wheels 10, 11, the load-carriers 14 are displaced by means of the conveyor carriages 13 coupled to the carriers to or from the loading or unloading point of the vehicle flap 8. Release of the desired one of the load-carriers 14, after arrival thereof on the flap 8, is carried out by turning the lever 20 in the direction indicated by arrow 29 in FIG. 4, whereupon the load-carrier may be pulled backwards along the guide 25. When the runner wheels 15 reach the plateau 37 they may again serve as support means for the load-carrier. To facilitate the movement of the wheels 15 up onto the plateau 37 the flap 8 is provided with a sloping surface 40 extending backwards towards the flap. The sloping surface 39 has been given an elongate extension to provide a slight inclination and thus minimize the force required to move the load-carrier to the coupling position thereof (FIG. 4).

In FIG. 6 the flap 8 is imagined manufactured from two superposed sheet metal plates 41 and 42 interconnected through welding. However, to facilitate the manufacture of the flap it is possible to produce it by hot pressing or hot forging one single sheet, thereby forming the sloping surfaces 39, 40 including the plateau 37 and the lower-level area 38 and the running tracks 35 and 36.

The embodiment as illustrated and described is to be regared as an example only and the flap 8 may be constructively altered in a variety of ways within the scope of the appended claims. For instance, the external contour shape as well as the size of the flap and also the means to effect the vertical movements of the flap and the folding thereof are independent of the invention and form no part thereof. FIG. 1 illustrates the vehicle provided with two flaps 7 and 8. However, the upper flap 7 may be completely eliminated and the lower flap 8 made sufficiently large to close the rear opening of the vehicle completely.

What I claim is:

1. An improvement in goods vehicles comprising a loading platform, a continuous conveyor means on said platform, a support beam extending in the longitudinal direction of said loading platform and arranged for longitudinal movement relative thereto, a pulley arranged at each end of said beam, said conveyor means travelling over said pulleys, equidistantly spaced driving carriages on said conveyor means, load-carriers, generally in the form of goods transport containers, driven by said driving carriages when engaged thereby, a first pair of runner wheels on each one of said load-carriers, the support shaft of said first pair of runner wheels being fixed, a second pair of runner wheels on each one of said load-carriers, the support shaft of said second pair of wheels being pivotally mounted, a movable deck provided at the rear of said goods vehicle, said deck arranged to be raised and lowered into a level essentially flush with the loading platform level, the improvement comprising said deck incorporating an oblique surface inclining upwardly and forwardly towards a plateau, said plateau delimiting an area positioned at a lower level, said first runner wheels of the load-carrier having the fixed support being arranged to move within said area without coming into contact therewith when said load carrier is in an engaged relation with one of said driving carriages.

2. An improved goods vehicles as claimed in claim 1, comprising a first semi-circular running track on said deck, said second load-carrier runner wheels supported on said pivotally mounted shaft being arranged to move on said track.

3. An improved goods vehicle as claimed in claim 2, comprising a second semi-cirular running track on said deck, runner wheels on said driving carriages, said driving carriage runner wheels arranged to move on said second track, the radius of said second track being less than the radius of said first track for said load-carrier runner wheels.

4. An improvement in goods vehicles, comprising a loading platform, a continuous conveyor means on said platform, a support beam extending in the longitudinal direction of said loading platform and arranged for longitudinal movement relative thereto, a pulley arranged at each end of said beam, said conveyor means travelling over said pulleys, equidistantly spaced driving carriages on said conveyor means, load-carriers, generally in the form of goods transport containers, driven by said driving carriages when engaged thereby, a first pair of runner wheels on each one of said load-carriers, the support shaft of said first pair of runner wheels being fixed, a second pair of runner wheels on each one of said load-carriers, the support shaft of said second pair of wheels being pivotally mounted, a movable deck provided at the rear of said goods vehicle, said deck arranged to be raised and lowered into a level essentially flush with the loading platform level, the improvement comprising said deck incorporating an oblique surface inclining upwardly and forwardly towards a plateau, said plateau delimiting an area positioned at a lower level, said first runner wheels of the load-carrier having the fixed support being arranged to move within said area without coming into contact therewith, a first semi-circular running track on said deck, said second load-carrier runner wheels supported on said pivotally mounted shaft being arranged to move on said track, a second semi-circular running track on said deck, runner wheels on said driving carriages, said driving carriage runner wheels arranged to move on said second track, the radius of said second track being less than the radius of said first track for said load-carrier runner wheels when said load carrier is in an engaged relation with one of said driving carriages.

5. An improved goods vehicle as claimed in claim 4, comprising said deck, including said inclining surface, said plateau, and said first and said second running tracks thereof being produced through mould-pressing of sheet metal.

* * * * *